United States Patent Office 3,357,834
Patented Dec. 12, 1967

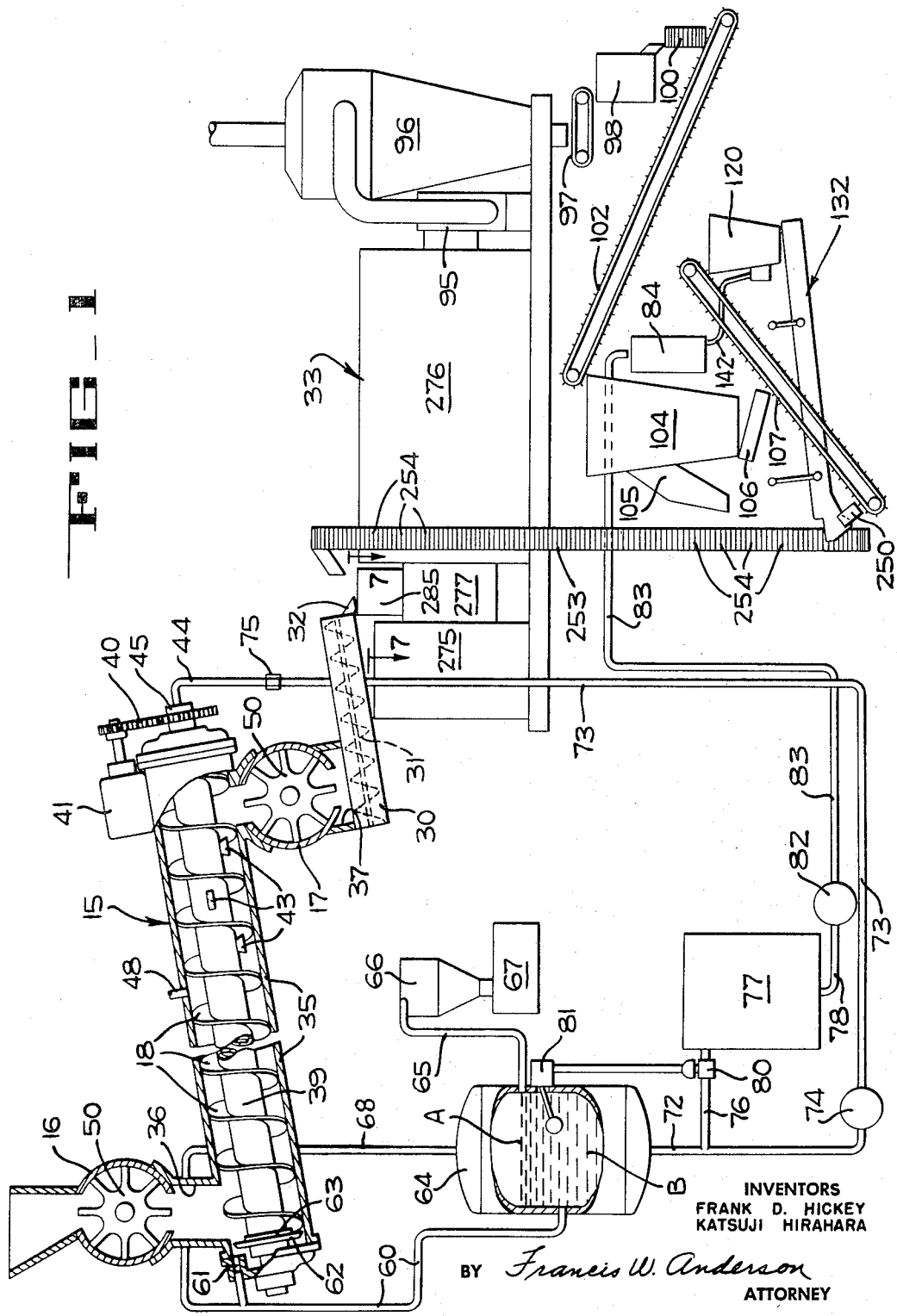

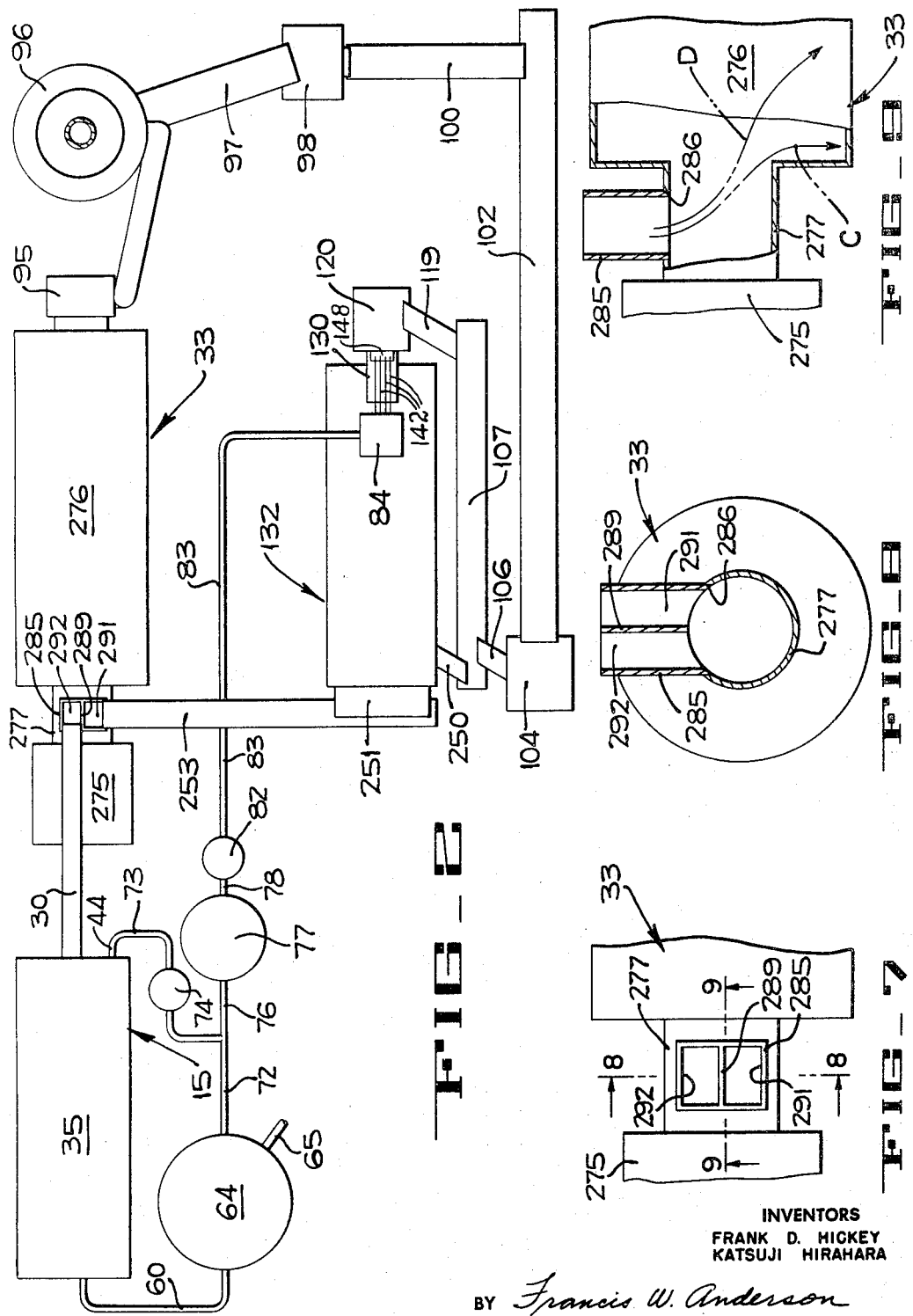

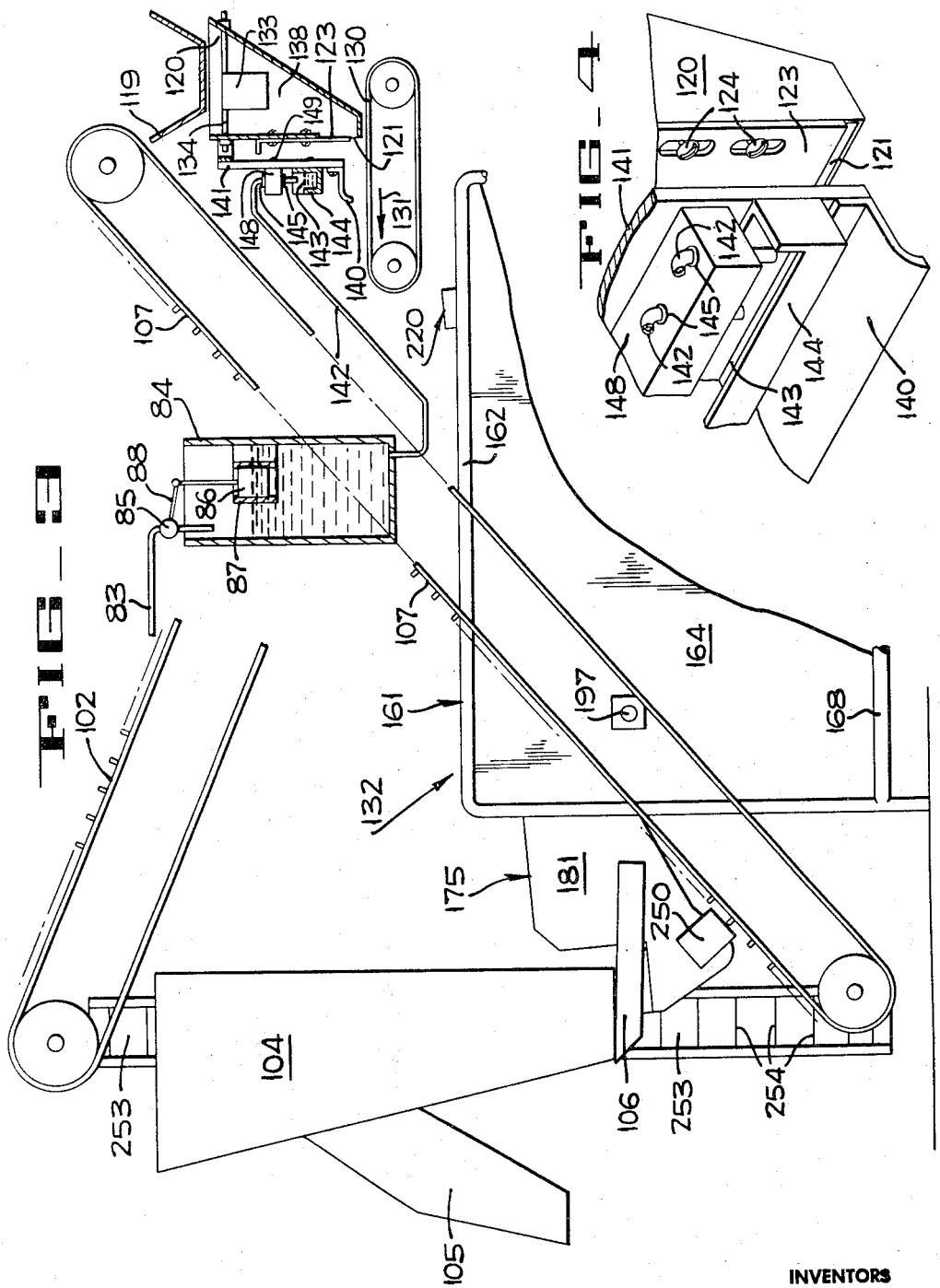

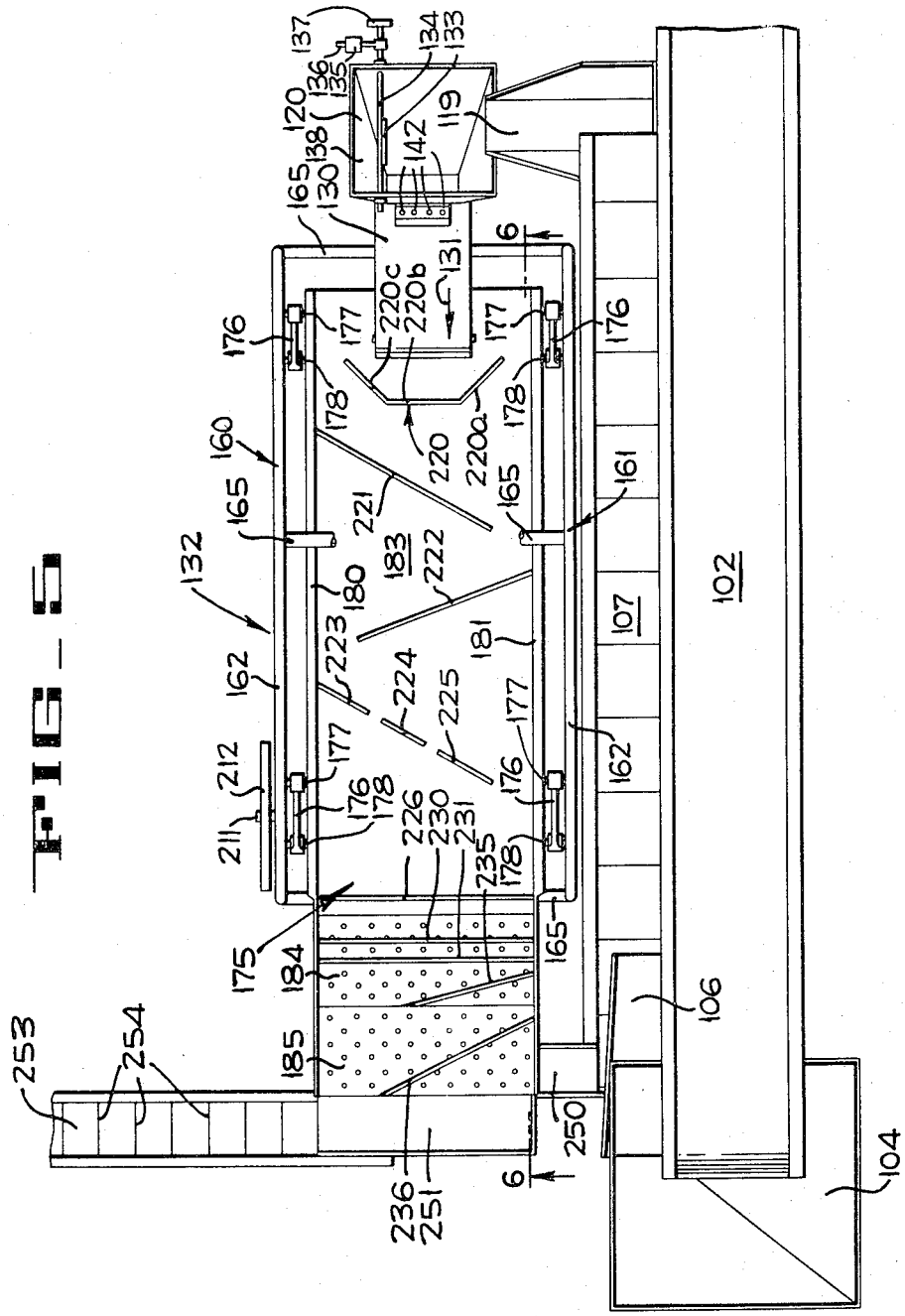

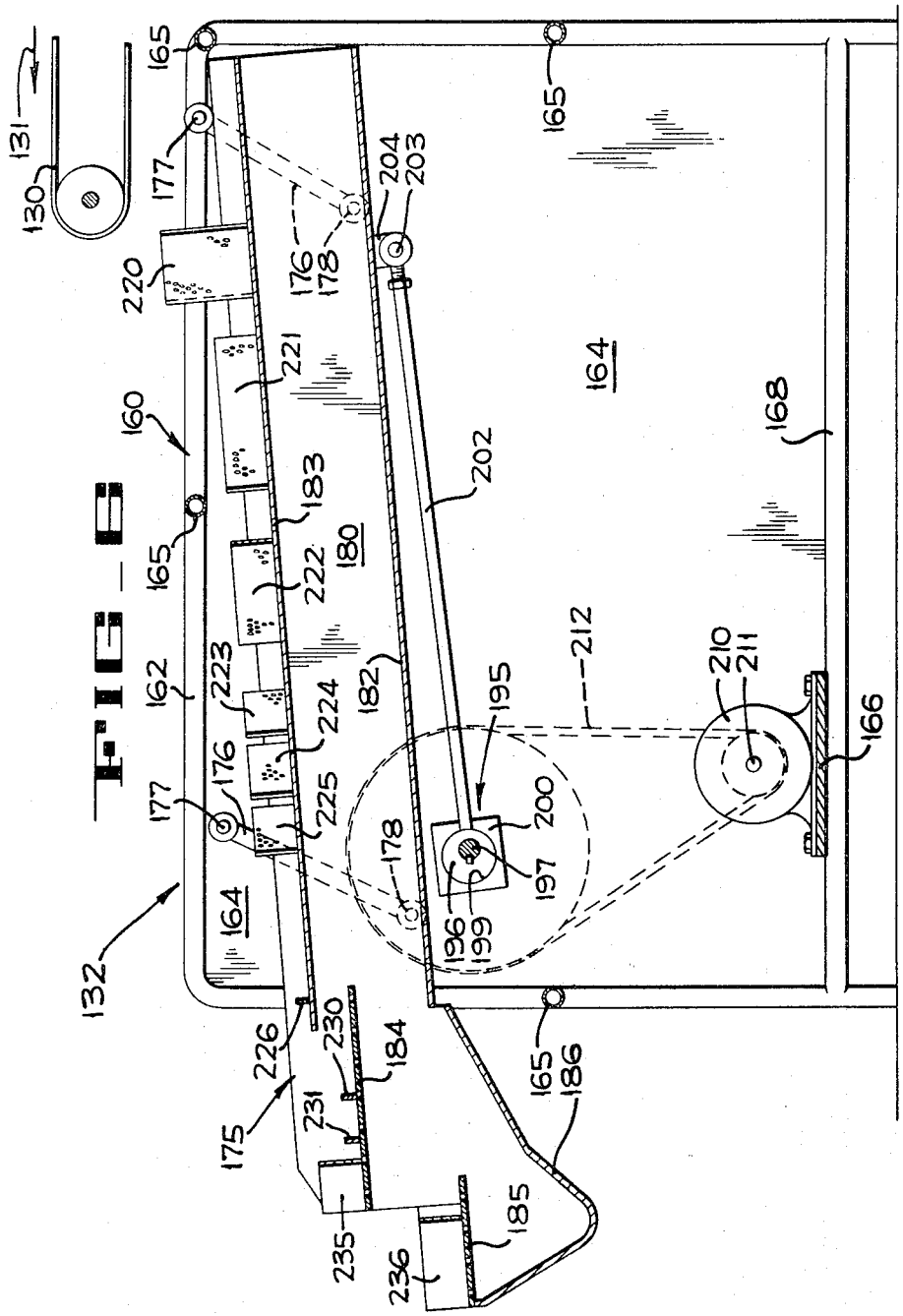

3,357,834
METHOD FOR PROCESSING FAT-CONTAINING SOLIDS
Frank D. Hickey and Katsuji Hirahara, San Jose, Calif., assignors to FMC Corporation, San Jose, Calif., a corporation of Delaware
Original application Nov. 22, 1963, Ser. No. 325,668. Divided and this application Oct. 15, 1965, Ser. No. 510,725
3 Claims. (Cl. 99—7)

ABSTRACT OF THE DISCLOSURE

Meat chunks are steam cooked, dried and granulated to provide a meal. Stickwater rendered during cooking is added to the meal for pelletizing. The pellets are re-cycled into the drier and excess, unpelleted meal is re-cycled with freshly granulated meal for receiving stick-water along with the latter before pelletizing. Thus, the granulated meal is protein-enriched.

---

This invention pertains to a method of processing fat-containing solids such as animal fats.

This application is a division of Hickey et al., Ser. No. 325,668, filed Nov. 22, 1963, now Patent 3,263,592, which claims apparatus for producing the invention.

When animal fats, meat scraps, and the like are cooked and processed to recover tallow and provide a high protein meal, one of the by-products of the cooking step is a sticky extract that is high in protein and is commonly referred to as stickwater. Since the commercial value of the meal as animal food depends upon its protein content, it is desirable that the high-protein stickwater be added to the meal. However, when stickwater is added directly to meal in large quantities, a sticky, viscous mass is formed which is very difficult to handle and is particularly difficult to dry. If stickwater is added in small quantities, the addition of protein to the meal is insufficient to raise the protein content of the meal to the desired level. Accordingly, it is an object of the present invention to make it possible to add substantial quantities of the stickwater to the meal without providing a sticky unmanageable mass.

Another object is to provide a simple, effective method of increasing the protein content of meal produced in a rendering process.

Other and further objects and advantages of the present invention will become apparent from the following description, taken in connection with the accompanying drawings in which:

FIGURE 1 is a diagrammatic side elevation, partly broken away, of the rendering system of the present invention.

FIGURE 2 is a diagrammatic plan of the system of FIG. 1.

FIGURE 3 is an enlarged diagrammatic side elevation of a portion of the system of FIG. 1, with parts broken away to more clearly disclose the apparatus.

FIGURE 4 is an enlarged diagrammatic perspective of a portion of the apparatus of FIG. 3.

FIGURE 5 is an enlarged diagrammatic plan of the apparatus of FIG. 3.

FIGURE 6 is a diagrammatic vertical section taken along line 6—6 of FIG. 5.

FIGURE 7 is an enlarged fragmentary diagrammatic plan of a portion of the apparatus of FIG. 1, the view being taken looking in the direction of arrows 7—7 of FIG. 1.

FIGURE 8 is a vertical section taken along line 8—8 of FIG. 7.

FIGURE 9 is a vertical section taken along line 9—9 of FIG. 7, certain parts being shown in elevation.

The embodiment of the present invention that is illustrated in FIGURE 1 comprises, in general, an inclined tubular pressure vessel 15 into which meat scraps, offal and the like are fed through an inlet pressure valve 16. This raw material enters the lower end of the vessel 15, which is inclined at about 10° to the horizontal, and is carried upwardly within the vessel by a helical conveying element 18. While moving upwardly in the vessel, the raw material is subjected to the action of steam for a predetermined time such that the material is cooked before it is discharged through a pressure valve 17 which is identical to pressure valve 16.

The cooked material is deposited on a conveyor 30 which has a rotatable screw 31 that moves the material to the discharge end of the conveyor, and forces it over the end of the conveyor housing into a chute 32. The chute 32 directs the material into a rotary drum dryer 33. When the cooked material is discharged from the dryer, it is in the form of substantially dry meal but is low in protein. In order to produce a commercially acceptable product, it is necessary to increase the protein content of the meal and this is accomplished, in accordance with the present invention, by a meal-recirculating system which will be explained presently.

The pressure vessel or cooker 15 is of commercial design and its details are not critical to the invention. The cooker illustrated as being suitable for carrying out the processes of the invention is a tubular member of the type identified as a CPV pressure vessel and manufactured by FMC Corporation of San Jose, Calif. The cooker comprises a cylindrical housing 35 having an upwardly projecting inlet conduit 36 at its lower end, communicating with the inlet pressure valve 16, and a downwardly directed discharge opening 37 at its upper end communicating with the discharge valve 17. The helical conveying element 18 is formed around a tubular shaft 39 that is journaled for rotation in the cooker housing. The shaft 39 is hollow and is arranged to be continuously driven during the processing operation through a chain and sprocket drive 40 and a variable speed motor-and-drive unit 41. A plurality of spray nozzles 43 are mounted on the tubular shaft 39, each nozzle communicating with the interior of the shaft to receive liquid which is delivered to the interior of the shaft through a conduit 44 that extends into a reduced diameter tubular end portion 45 of the tubular shaft 39. Since the shaft 39 rotates, and the conduit 44 is stationary, a swivel pipe joint must be provided between the shaft 39 and conduit 44. A suitable joint is shown in the Allen et al. Patent 2,330,197. Processing steam is directed into the vessel through one or more conduits 48, and suitable means (not shown) are provided for controlling the pressure, the amount of steam, and the circulation of steam through the vessel.

The pressure valves 16 and 17 may be of the type disclosed in the patent to William de Back No. 2,638,137. In general, each of these valves includes a rotor 50 that is driven by a motor (not shown). Each rotor has blades which define pockets by which material is carried into or discharged from the cooker with a minimum amount of loss or pressure from the cooker.

While the cooked material is being discharged from the upper end of the cooker 15, a mixture of liquid protein and fat is being discharged from the lower end of the cooker through a conduit 60 which extends through an opening 61 in the lower end wall of the cooker. During the cooking operation, fat and liquid protein accumulate in the lower end of the vessel so that a floating surface layer of liquid fat continuously drains out of the cooker through conduit 60. A disc 62 is removably secured to a flange 63 on shaft 39. The diameter of the flange 63 is such that a clearance space is provided between the periphery of the disc and the inner surface of the housing of the cooker through which the fat and proteinaceous liquid can pass The fat that passes through conduit 60 is directed to a decanter 64 in which the fat separates into a relatively light upper portion A of fat or tallow and a relatively heavy lower portion B of aqueous protein which will be referred to hereinafter as stickwater. The decanter is described and claimed in the application for U.S. Letters Patent of Hirahara Ser. No. 203,121 filed June 18, 1962, now Patent No. 3,211,535 which is assigned to the assignee of the present invention. A rendering system including a pressure cooker, a decanter, and means for processing meal from the cooker, the fat or tallow A, and the stickwater B is disclosed in the application for U.S. Letters Patent of Hickey et al., Ser. No. 211,761 filed July 23, 1962, which is assigned to the assignee of the present invention. Reference may be had to said Hirahara and Hickey et al. applications for a complete description of any similar parts of the present invention that are not specifically described herein.

As disclosed in said Hickey et al. application the fat or tallow A is removed from the decanter 64 and moved under the influence of the pressurized atmosphere in the upper end of the decanter through a conduit 65 to a cyclone unit 66 which causes steam and moist air to be discharged from the upper end thereof and causes the tallow to move downwardly into a settling tank 67. A conduit 68 establishes communication between the interior of the decanter 64 and the interior of the cooker 15 on the downstream side of the filtering disc 62 and, as a result, the pressure in the upper end of the decanter is maintained at substantially the pressure of the cooker 15. From the tank 67 the tallow is moved to a vacuum type, moisture-separator (not shown) where moisture is removed and tallow is discharged, with a low moisture content of between 0.02 percent and 0.03 percent, and pumped to a storage container.

The stickwater B is removed from the decanter 64 through an opening in the lower end that communicates with a conduit 72 leading to a pump 74. The pump forces the stickwater through a conduit 73 that is connected by a pipe union 75 to conduit 44 that delivers the stickwater to the spray nozzles 43 inside the cooker. Accordingly, with this arrangement, a portion of the stickwater leaving decanter 64 is sprayed into the material being moved upwardly in the cooker to wash fat from the material. Since the stickwater has a very low fat content, it is very effective for stripping fat from the material being cooked.

Another portion of the stickwater is directed into a conduit 76 which projects laterally from conduit 72 and is arranged to conduct the stickwater to a surge tank 77 which is provided with a discharge conduit 78. A valve 80 in conduit 76 is controlled by an interface control unit 81 that is effective to open the valve 80 when the interface between the tallow portion A and the stickwater portion B rises above a certain level. When valve 80 is open, the stickwater flows into the surge tank 77 from which it is removed by a pump 82 and delivered through a conduit 83 to a tank 84 in which a constant head of stickwater is maintained by means of a float that is disposed in the tank and is mechanically connected to a valve 85 in conduit 83. Any conventional float-controlled valve mechanism may be used, as for example a float 86 (FIG. 3), disposed in a fixed guide tube 87 and connected by a linkage 88 to the actuator of a valve 85.

Since the protein content of the meal is low and since stickwater is high in protein, the stickwater in tank 84 is added to the meal by dispersing it in meal that has already been dried, and then recycling the protein-enriched meal through the drier. It has been found that, if stickwater is added directly to the dry meal in quantities such that the dry meal is substantially uniformly wetted with the stickwater, a sticky mass is formed that cannot be efficiently dried in conventional industrial driers. A special feature of the present invention is the unique manner in which the stickwater is added to the dry meal so that the formation of sticky masses of meal is avoided, and the protein-enriched meal is put into a form in which it can be efficiently handled in standard industrial driers.

When meal leaves the drier 33, it is picked up by a blower 95 and discharged into a cyclone unit 96. In the unit 96, the meal works downwardly to the lower end of the cyclone where it is discharged onto a conveyor 97 which delivers it to a hammermill 98. Conveyor 97 may be of any suitable type such as an endless belt arranged to deliver the meal to the inlet opening of the hammermill. An endless belt conveyor 100 receives the meal from the hammermill and deposits it on the lower end of an upwardly inclined endless belt conveyor 102 that has upstanding, transversely disposed flights which carry the meal upwardly and discharge it into the upper open end of a storage hopper 104. A chute 105 projects from one side wall of hopper 104 and is provided with conventional gate means so that bags can be selectively filled from this chute. The pan 106 (FIGS. 3 and 5) of a Syntron vibrator unit extends under an opening at one side of the bottom wall of the hopper 104 and is effective to continuously deliver dried meal to an elevating conveyor 107 which may be of an endless belt type having transverse pusher flights. The Syntron vibrator is an electrically operated unit that has a rheostat controlling the input to a motor whereby the amplitude of vibration or length of stroke may be varied to vary the rate of discharge of meal onto the elevator conveyor 107 and to start and stop the feeding of meal from the vibrator to the conveyor 107.

The elevating conveyor 107 delivers the feed into a chute 119 that leads to a hopper 120. The hopper is open at the top and has an opening 121 in its forward wall that is arranged to be partially closed by an adjustable plate 123. The plate 123 (FIG. 4) is held in adjusted position by a plurality of bolts 124 that extend through vertically extending slots in the plate 123 and through holes in the front wall of the hopper. The plate 123 is so adjusted that a layer of meal of predetermined depth, as for example 2 inches, is maintained on the upper surface of an endless belt conveyor 130. The upper run of the conveyor 130 moves in the direction of arrow 131 and eventually discharges the meal onto the bed of a vibrating shaker unit 132.

In order to maintain a predetermined quantity of meal in the hopper 120, a rigid plate 133 (FIGS. 3 and 5) is secured to and extends downwardly from a rod 134 which is journaled for rotation in the upper end portions of the front and rear wall of the hopper 120. Counterweight 135 is adjustably secured as by setscrews to a short arm 136 that is welded to and projects outwardly from the rod 134. A mercury switch 137, which is secured to the end of rod 135, has contacts that are connected in the control circuit that supplies power to the Syntron vibrator. When meal is delivered to the hopper 120 by the chute 119, it builds up in the hopper until it engages the plate 133 and swings it toward the side wall 138 of the hopper. When the amount of meal in the hopper approaches the desired quantity, the contacts of the mercury switch open to cut off the power to the Syntron vibrator and stop the feeding of meal to the elevator conveyor 107. When the quantity of meal decreases, the plate 133 is permitted to swing inwardly of the hopper and away from side wall 138 until the mercury switch contacts close and start the operation of the vibrator. It will be apparent that the counterweight 135 provide means for varying the point at which the contacts of the mercury switch close. With the above arrangement, the hopper is supplied with meal in accordance with the demand.

While the layer of meal is being advanced on the conveyor 130, a thin sheet of stickwater is directed downwardly onto the meal by means of a guide plate 140

(FIG. 4) that has a curved lower end which terminates close to the top of the layer of meal. Stickwater from the tank 84 is carried through a plurality of conduits 142 to an elongate container 143 that is mounted on a frame support member 141 and has a wall 144 defining a weir over which the stickwater passes as it drops onto the guide plate 140. Since the head in the tank is constant, the rate of discharge of stickwater into the container 143 and over the weir is substantially constant. Accordingly, a thin curtain of stickwater is continuously deposited on the meal as the meal passes below the guide plate 140. The conduits 142 are secured as by clamps 145 or the like in a mounting block 148 that is adjustably secured on the frame support member 141 by a screw 149 which extends through a vertical slot in member 141 and is threaded into the block 148. By adjusting the block 148 in a vertical direction, the pressure in the conduits and the amount of liquid flow can be varied.

The shaker unit 132 comprises a frame support structure made up of two side panels 160 and 161 (FIG. 5). Each panel includes an inverted U-shaped bordering member 162 (FIG. 6) made of relatively heavy tubular metal stock and a plate 164 that is welded to the inner edges of the member 162. The two panels 160 and 161 are secured to each other in spaced relation by a plurality of transverse bracing members 165 and by a plate 166 that is secured between two longitudinal tubular braces 168 (one only being shown).

A shaker bed 175 is mounted in the upper portion of the unit on four rocker arms 176 each of which is pivoted at its upper end on a stud 177 projecting from the adjacent side panel and, at its lower end, on a stud 178 projecting from a side wall of the shaker bed. The shaker bed is made of heavy guage sheet steel and includes two upstanding side walls 180 and 181 (FIG. 5) which are secured together in spaced relation by a bedplate 182 (FIG. 6), a top deck 183, an upper screening plate 184, a lower screening plate 185, and an irregularly shaped transverse plate 186 that extends across the lower edge of the shaker bed near the forward end thereof.

The shaker bed is reciprocated longitudinally of the unit by means of an eccentric drive mechanism 195 which includes an eccentric roller 196 keyed to a shaft 197 and held in a cylindrical hole 199 in a block 200. The block 200 is formed integrally with a connecting rod 202 that is pivotally disposed on a pin 203. Two identical short arms 204 (one only being shown in FIG. 6) are rigidly secured to the bedplate 182 and extend downwardly therefrom to support the pin 203 therebetween. The shaft 197 to which the eccentric is keyed is journaled for rotation in bearing blocks secured to the plates 164 of the side panel. A motor 210 is mounted on the lower support plate 166 and is connected in driving relation to shaft 197 through a shaft 211 and a belt and pulley drive 212. Accordingly, when the motor is energized, the inclined shaker bed 175 is reciprocated back and forth, causing dry meal deposited on its upper end portion to be moved downwardly to the lower end.

A series of baffles 220–226 are secured in fixed position on the upper surface of the top deck 183. The baffle 220 is about six inches high and has three angular disposed inperforate panels 220a, 220b, and 220c (FIG. 5) that define a pocket in which meal received from the conveyor 130 is temporarily detained. Each of the baffles 221–225 is about three inches high and has a plurality of spaced perforations therethrough that are approximately three-sixteenths of an inch in diameter covering substantially their entire area. As seen in FIG. 5, baffle 221 extends inwardly from wall 180 and is inclined forwardly relative to the direction of movement of the meal in the shaker unit. Baffle 222 extends inwardly from side wall 181 and is inclined forwardly. The three baffles 223, 224 and 225 are mounted in spaced relation in a line extended inwardly and forwardly from side wall 180. Baffle 226 is a solid member that is approximately one inch high and extends transversely of the unit from wall 180 to wall 181. Accordingly, the meal must travel over the baffle 226 while it can travel around the ends of baffles 220–225.

The uppermost screening plate 184 is provided with two solid transverse baffles 230 and 231 that are approximately one inch high. A baffle 235, that is approximately three inches high, extends inwardly and forwardly from side wall 181. The lower screening plate 185 is provided with only one baffle 236 that is a solid member about three inches in height. The baffle 236 also extends inwardly and forwardly from side wall 181. The screening plates 184 and 185 are perforated throughout substantially their entire area, plate 184 having spaced perforations that are three-sixteenths of an inch in diameter and plate 185 having spaced perforations one-quarter of an inch in diameter.

As will be explained presently, as the meal progresses downwardly on the shaker bed, some of it is formed into small balls or pellets while the remainder passes through the screen decks 184 and 185 and is directed by the floor plate 186 into a chute 250 (FIGS. 3 and 5) that is inclined downwardly toward a lower end portion of the elevator conveyor 107. Accordingly any meal, that is not incorporated into one of the pellets, is elevated again and recirculated through the pellet-forming mechanism. The pellets that are formed are directed, by the baffles 235 and 236 into a chute 251 which is inclined in a direction to guide the pellets into a second elevator conveyor 253. This conveyor is also of the endless belt type and has transverse flights 254 adapted to retain the pellets on the moving surface of the belt as they are elevated.

As previously mentioned, it is desirable to add the stickwater resulting from the cooking operation to the meal to raise the protein content of the meal. However, it has been found that, if the desired quantity of stickwater is added to the meal and the wet sticky mixture is directed into a drier, an unmanageable sticky mass is formed which cannot be effectively dried. In accordance with this invention, the stickwater is added to meal which has been previously dried and then the mixture of stickwater and meal is so processed that pellets or balls are formed that have a wet center or core and an enclosing layer or cover of dry meal. Then, when these pellets are directed into a drier, no sticky mass of material will form. Rather, the pellets will substantially maintain their generally spherical form and, as they move through the drier, the inner wet core will be dried so that the entire pellet is in a substantially dry condition when it leaves the drier. When this method is used, more of the stickwater can be added to the meal in a given time than is possible with any other method.

The manner in which pellets are formed will be explained with particular reference to FIGS. 5 and 6. As the layer of meal from the hopper 120 is carried on the upper surface of the belt 130, a thin curtain of stickwater is directed downwardly onto its upper surface. The rate of flow of the stickwater and the feeding of dry meal is regulated so that a maximum amount of stickwater will be added to the meal; however, it cannot be added so fast that it will penetrate through the layer of meal and become stuck to the surface of the belt 130. When the feed of stickwater and meal is properly adjusted, some of the meal on belt 130 is wetted with stickwater while some of it remains dry. When the mixture of meal and stickwater drops off the belt 130, it is deposited in the pocket formed by the 6" high baffle 220. As the shaker bed reciprocates, the mixture works its way around the ends of the wing portions 220a and 220c and moves down the deck 183 to engage the perforated baffles 221 and 222. Due to the continuous vibrating of the shaker bed, the wetted portions of the meal separate and form nuclei about which pellets can be formed. As the wet nuclei engage the baffle 221 and move downwardly along its slanted face, dry meal that is working its way down the deck 183 contacts the wet nuclei and form a coating thereon. When the small pellets that are thus formed pass around the lower end of baffle 221, they are directed against baffle 222. Meanwhile, particles of dry meal move through the perforations of baffle 221 and move downwardly along the deck to intercept the small pellets moving along the slanted baffle 222. Accordingly, the size of the pellets is increased. The same action takes place as the pellets move along the baffles 223, 224 and 225 and the dry meal filters through the perforations in baffle 222.

By the time the pellets reach the transverse baffle 226 on the upper deck, they have attained the desired size which may be in the range of from 1/8" to 1/4" in diameter. The pellets and dry meal work their way over baffle 226 and drop onto the screening deck 184. On this screening deck the small particles of dry meal pass through the perforations in the deck while the pellets work their way over baffles 230 and 231 and are directed by baffle 235 onto the lower screen 185. Again, small particles of meal pass through the perforations in the deck while the pellets are directed by baffle 236 onto the chute 251 which guides them onto the second elevator conveyor 253.

The drier 33 may be any of several commercial driers its details not being critical to the invention. One example of a drier that can be used is known as a Model SD45-12 three pass, direct fired rotary drier manufactured by the Heil Company of Milwaukee, Wis. In general, such a drier includes a gas-burning heater section 275 connected to a rotary drum section 276 by a large diameter, generally tubular conduit 277. The heater has suitable air intake passages and has internal partitions defining a combustion chamber and a separate bonnet which communicates with the large tubular conduit 277. The blower 95 draws air from the bonnet of the heater, through the conduit 277 and through the rotary drum section of the drier. This drum section may include three concentric rotating drums mounted on trunnions. Material directed into the drum section is disposed in the innermost drum first, and successively passes through the other two drums until it is discharged into the central inlet opening of the blower 95 which conveys the material to the cyclone unit 96.

Since the pellets being elevated on conveyor 253 and the material being conveyed from the cooker on conveyor 30 must be directed into the drier through the same opening in the large conduit 277 and, since it is desirable that the pellets do not mix with the very wet material from the cooker, a two-passage, vertically extending conduit 285 is mounted on the conduit 277 over a large opening 286 in conduit 277. A vertical partition 289 extends across the inside of vertical conduit 285 to divide the interior into two passages 291 and 292. The upper end of the second elevating conveyor 253, overlies passage 291 and discharges the pellets into this passage, while the chute 32 at the discharge end of conveyor 30 overlies passage 292 for directing material into that passage. As the relatively heavy, wet material from the cooker enters the large conduit 277, it is caught up by the stream of hot air passing therethrough and is carried forwardly a short distance as indicated in FIG. 9 by arrow C. When the relatively light pellets drop into conduit 277, they are entrained in the hot air stream and carried forwardly a greater distance as indicated by arrow D. Thus the hot air stream automatically maintains the separation between the wet material from the cooker and the pellets.

As the pellets are tumbled in the rotating drums and are conveyed along the drier by the air stream, they are progressively dried and, when they reach the blower 95 they are substantially moisture free. Similarly, the material from the cooker is progressively dried and reaches the blower with very low moisture content. It should be noted that this material from the cooker is not particularly difficult to dry since it consists approximately of 40% soluble protein and 60% water, a large part of the greasy material that contains the stickwater having been separated out of the cooked product while in the cooker. However, since the greasy material has been separated out, the cooked product is low in protein and the stickwater must be re-introduced into the meal. As is now evident, the enclosing of the stickwater in balls or pellets in a casing of dry meal makes possible the efficient incorporation of the stickwater in the meal to form a product that is high in protein.

It will be understood that conventional support structures are provided for the various pieces of apparatus. Also, it is evident that the several movable members, such as conveyors, are driven through suitable well-known mechanisms such as individual, motor-driven sprocket and chain drives or from a common source of power through conventional drive mechanisms. The drive mechanisms and the motors are chosen so that a desired timed relation of the various operating members can be maintained, the motors being variable-speed motors if desired. In one installation where the shaker bed was approximately 7 feet long and 2 feet wide, the motor 210 was rated at 3/4 HP when operating at 1800 r.p.m. The belt and pulley drive 212 was chosen to give a 4.5 to 1 speed reduction. The eccentric drive was arranged to a give a 1 1/4 inch horizontal throw of the shaker bed and a 1/2 inch vertical throw when operating at 430 cycles per minute. The top deck 183 was inclined between 5 and 6 degrees to the horizontal.

The dry meal delivered to the hopper 120 by the elevating conveyor 107 had a moisture content of approximately 8% by weight and, when stickwater was added to this meal and the mixture was vibrated, in the manner previously described, pellets that were from 1/4 to 1/2 inch in diameter were formed.

From the foregoing description it will be apparent that the present invention provides a unique method of incorporating high protein extract in cooked meal and thereby makes possible an efficient system for rendering fat-containing solids. The concept of enclosing wet, sticky material in a coating of dry material so that it can be efficiently handled has resulted in an efficient method of enriching the meal. Also, since the rate of discharge of stickwater and the quantity of meal with which the stickwater is mixed can be varied, it is possible to so control the formation of the mixture that a maximum amount of stickwater is incorporated in the meal.

While a particular embodiment of the present invention has been shown and described, it will be understood that the rendering method of the present invention is capable of modification and variation without departing from the principles of the invention, and that the scope of the invention should be limited only by the scope and proper interpretation of the claims appended hereto.

Having described our invention, what we claim as new and desire to protect by Letters Patent is:

1. In a process for producing protein-enriched meal from animal material, the process being of the type wherein the starting animal material is cooked in a steam cooker, the cooked material is run through a drier, and wherein the protein-rich stickwater by-product of the cooking step is re-incorporated in the material; the improvement comprising the steps of granulating the cooked and dried material leaving the drier into a meal, adding stickwater to the granulated meal and agitating the enriched mixture so that a portion of the meal agglomerates into protein-enriched pellets of selected size, there being an excess of enriched meal which is not agglomerated to selected pellet size; enriching subsequently formed pellets by separating the excess but enriched meal from the selected enriched pellets, and re-cycling the excess enriched meal by adding it to granulated meal from the drier which is to receive stickwater in preparation for the pelletizing step; enriching the cooked material in the drier by re-cycling the selected enriched pellets into the drier and mixing them with the material therein so that said granulation of the material leaving the drier includes granulation of re-cycled, previously enriched pellets and thus builds up the net protein content of the granulated meal; and withdrawing granulated meal for use, at a selected level of protein enrichment.

2. The process of claim 1, wherein said protein-enriched pellets are re-cycled into the drier while the pellets are still internally damp from the stickwater.

3. The process of claim 1, wherein the stickwater by-product is divided into parts, one part being that added to the granulated meal, another part being sprayed into the steam cooker.

References Cited

UNITED STATES PATENTS

| | | |
|---|---|---|
| 1,656,572 | 1/1928 | Schultze. |
| 2,534,640 | 12/1950 | Valen _____ 99—7 |
| 2,589,288 | 3/1952 | Ryan _____ 99—7 |
| 2,623,298 | 12/1952 | Fladmark _____ 99—7 X |
| 2,751,301 | 6/1956 | Leslie et al. |
| 3,057,727 | 10/1962 | Shields. |

A. LOUIS MONACELL, *Primary Examiner.*

D. J. DONOVAN, J. M. HUNTER,

*Assistant Examiners.*